United States Patent
Zhao et al.

(10) Patent No.: US 10,325,343 B1
(45) Date of Patent: Jun. 18, 2019

(54) TOPOLOGY AWARE GROUPING AND PROVISIONING OF GPU RESOURCES IN GPU-AS-A-SERVICE PLATFORM

(71) Applicant: EMC IP Holding Company LLC, Hopkinton, MA (US)

(72) Inventors: Junping Zhao, Beijing (CN); Zhi Ying, Shanghai (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 15/669,452

(22) Filed: Aug. 4, 2017

(51) Int. Cl.
*G06T 1/20* (2006.01)
*H04L 29/06* (2006.01)

(52) U.S. Cl.
CPC ............. *G06T 1/20* (2013.01); *H04L 67/42* (2013.01)

(58) Field of Classification Search
CPC . G06T 1/20; H04L 67/42; G06F 1/206; G06F 1/3203; G06F 1/3206; G06F 1/3253; G06F 1/3287; G06F 1/329; G06F 9/50; G06F 9/5094
See application file for complete search history.

(56) References Cited

U.S. PATENT DOCUMENTS

| | | | |
|---|---|---|---|
| 6,888,831 B1 | 5/2005 | Hospodor et al. | |
| 8,938,416 B1 | 1/2015 | Cole et al. | |
| 9,836,354 B1 | 12/2017 | Potlapally et al. | |
| 9,984,648 B2 | 5/2018 | Chakraborty et al. | |
| 2008/0195843 A1 | 8/2008 | Muniandy | |
| 2009/0089560 A1 | 4/2009 | Liu et al. | |
| 2011/0131430 A1 | 6/2011 | Krishnamurthy et al. | |
| 2012/0011401 A1 | 1/2012 | Ranganathan et al. | |
| 2014/0198112 A1 | 7/2014 | Miyamoto et al. | |
| 2014/0325073 A1 | 10/2014 | Urbach | |
| 2015/0213163 A1 | 7/2015 | Yang et al. | |
| 2015/0271331 A1 | 9/2015 | Segre et al. | |

(Continued)

OTHER PUBLICATIONS

Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.

(Continued)

*Primary Examiner* — Xilin Guo
(74) *Attorney, Agent, or Firm* — Ryan, Mason & Lewis, LLP

(57) ABSTRACT

Techniques are provided for implementing a graphics processing unit (GPU) service platform that is configured to provide topology aware grouping and provisioning of GPU resources for GPU-as-a-Service. A GPU server node receives a service request from a client system for GPU processing services provided by the GPU server node, wherein the GPU server node comprises a plurality of GPU devices. The GPU server node accesses a performance metrics data structure which comprises performance metrics associated with an interconnect topology of the GPU devices and hardware components of the GPU sever node. The GPU server node dynamically forms a group of GPU devices of the GPU server node based on the performance metrics of the accessed data structure, and provisions the dynamically formed group of GPU devices to the client system to handle the service request.

20 Claims, 6 Drawing Sheets

(56) References Cited

U.S. PATENT DOCUMENTS

| | | | |
|---|---|---|---|
| 2015/0317192 A1 | 11/2015 | Munshi et al. | |
| 2016/0247248 A1 | 8/2016 | Ha et al. | |
| 2017/0132746 A1* | 5/2017 | Wilt | G06T 1/20 |
| 2017/0220949 A1 | 8/2017 | Feng et al. | |
| 2017/0293758 A1 | 10/2017 | Saxena et al. | |
| 2017/0353397 A1 | 12/2017 | Che | |
| 2018/0075347 A1 | 3/2018 | Alistarh et al. | |
| 2018/0276044 A1* | 9/2018 | Fong | G06F 9/5038 |

OTHER PUBLICATIONS

Tensorflow, "Tensor/Tensorflow," https://github.com/tensorflow/tensorflow/blob/master/tensorflow/python/training/saver.py, 2015, 32 pages.

S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.

Tony Paikeday, "Seven Service Providers Delivering the GPU-Accelerated Cloud—Built on NVIDIA GRID," https://blogs.nvidia.com/blog/2016/09/27/the-gpu-accelerated-cloud/, Sep. 27, 2016, 4 pages.

amazon.com, Linux "Accelerated Computing Instances," http://docs.aws.amazon.com/AWSEC2/latest/UserGuide/using_cluster_computing.html, 9 pages.

Tiffany Trader, "Microsoft Puts GPU Boosters on Azure Cloud," https://www.hpcwire.com/2016/09/29/microsoft-puts-gpu-boosters-on-azure-cloud/, Sep. 29, 2015, 3 pages.

U.S. Appl. No. 15/498,055 filed in the name of Junping Zhao et al. Apr. 26, 2017 and entitled "Intelligent Data Coordination for Accelerated Computing in Cloud Environment."

U.S. Appl. No. 15/496,568 filed in the name of Junping Zhao et al. Apr. 25, 2017 and entitled "Checkpointing for GPU-as-a-Service in Cloud Computing Environment."

U.S. Appl. No. 15/391,223 filed in the name of Yifan Sun et al. Dec. 27, 2016 and entitled "Queue-Based GPU Virtuaiization and Management System."

U.S. Appl. No. 15/487,887 filed in the name of Yifan Sun et al. Apr. 14, 2017 and entitled "Managing Access to a Resource Pool of Graphics Processing Units Under Fine Grain Control."

* cited by examiner

| CONNECTION TYPE | PRIORITY SCORE | DESCRIPTION |
|---|---|---|
| NVLINK | 1 | GPU Interconnect Path Includes NVLINK |
| PIX | 2 | GPU Interconnect Path Includes Internal PCIe Switch |
| PXB | 4 | GPU Interconnect Path Includes Multiple Internal PCIe Switches |
| PHB | 5 | GPU Interconnect Path Includes PCIe Host Bridge |
| SOC | 10 | GPU Interconnect Path Includes Socket-Level Link (e.g., QPI) |

|  | GPU0 | GPU1 | GPU2 | GPU3 | mlx5_0 |
|---|---|---|---|---|---|
| GPU0 | X | 2 | 10 | 10 | 5 |
| GPU1 | 2 | X | 10 | 10 | 5 |
| GPU2 | 10 | 10 | X | 2 | 10 |
| GPU3 | 10 | 10 | 2 | X | 10 |
| mlx5_0 | 5 | 5 | 10 | 10 | X |

800

US 10,325,343 B1

TOPOLOGY AWARE GROUPING AND PROVISIONING OF GPU RESOURCES IN GPU-AS-A-SERVICE PLATFORM

FIELD

This disclosure relates generally to techniques for managing and utilizing processor resources in a computing system.

BACKGROUND

Various types of special-purpose processors, such as graphics processing units (GPUs) for general purpose computing, have been developed to accelerate the processing of specific types of workloads. Architecturally, a GPU has a massively parallel architecture which typically comprises hundreds or thousands of cores that are configured to concurrently execute hundreds or thousands of threads at a given time. This is in contrast to a standard central processing unit (CPU) architecture which typically comprises a few cores and associated cache memory, which are optimized for sequential serial processing and handling a few software threads at a given time.

The processing capabilities of GPU resources are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning, data mining, video data transcoding, image analysis, image recognition, virus pattern matching, augmented reality, encryption/decryption, weather forecasting, big data comparisons, and other applications with computational workloads that have an inherently parallel nature. Due to the high-throughput and low energy consumption per operation exhibited by GPUs, it is anticipated that GPU-as-a-Service (GPUaaS) will become mainstream in the near future, wherein cloud-based systems will implement GPU powered blades for various types of processing.

SUMMARY

Illustrative embodiments of the invention generally include systems and methods for implementing a GPU service platform that is configured to provide topology aware grouping and provisioning of GPU resources for GPUaaS. In one embodiment, a method comprises: receiving, by a GPU server node, a service request from a client system for GPU processing services provided by the GPU server node, wherein the GPU server node comprises a plurality of GPU devices; accessing a performance metrics data structure which comprises performance metrics associated with an interconnect topology of the GPU devices and hardware components of the GPU sever node; dynamically forming a group of one or more GPU devices of the GPU server node based on the performance metrics of the accessed data structure; and provisioning the dynamically formed group of one or more GPU devices to the client system to handle the service request.

Other embodiments of the invention include, without limitation, systems and articles of manufacture comprising processor-readable storage media and computing nodes.

BRIEF DESCRIPTION OF THE DRAWINGS

FIG. 6A illustrates a data structure which comprises configurable performance metrics for different types of possible connections in a given GPU server topology, according to an embodiment of the invention.

FIG. 6B illustrates a performance metrics data structure which comprises performance metrics associated with a detected interconnect topology of GPU devices and hardware components of a given GPU sever node, according to an embodiment of the invention.

DETAILED DESCRIPTION

Figure 1:
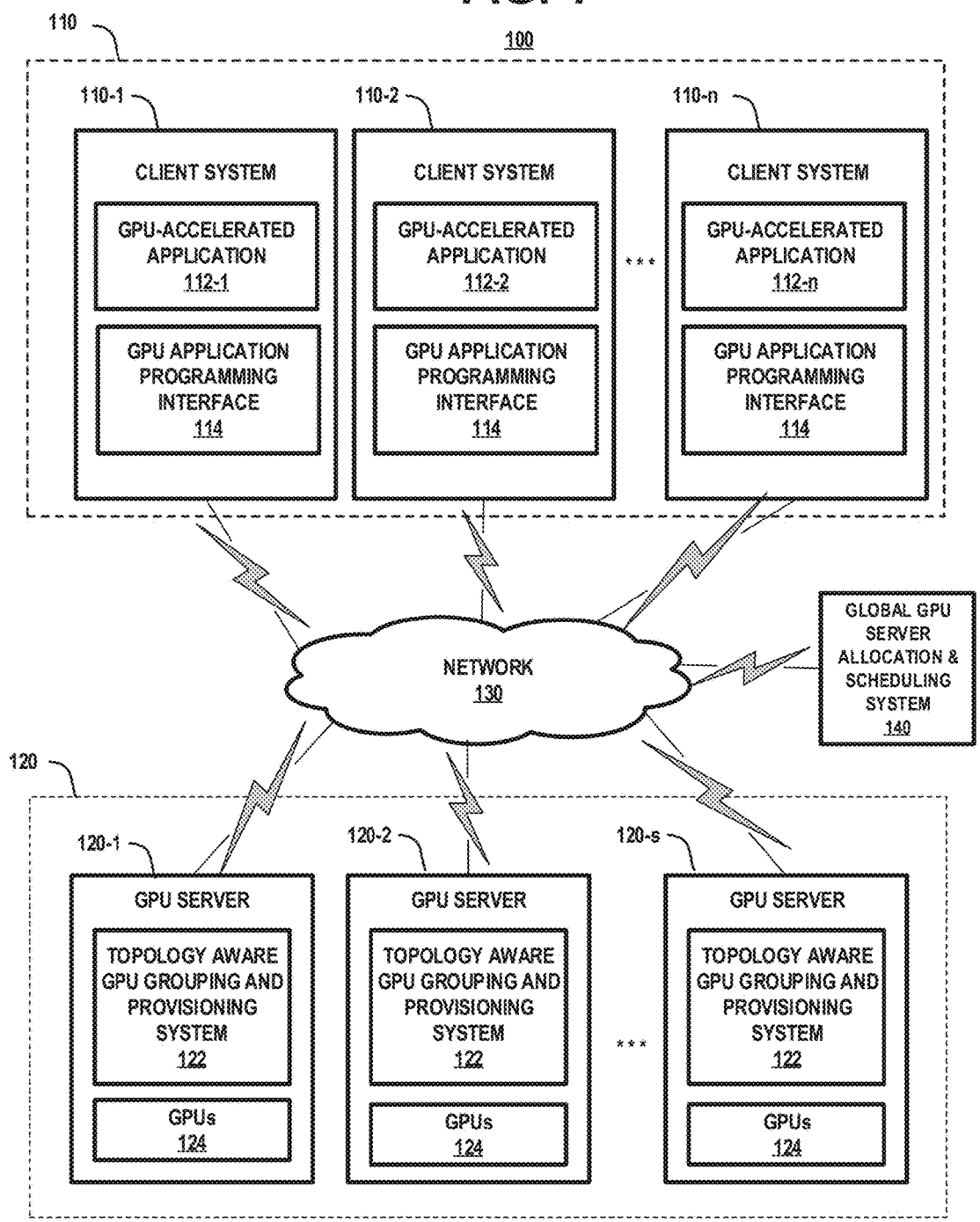
FIG. 1 is a high-level schematic illustration of a computing system which implements a GPU service platform that is configured to provide topology aware grouping and provisioning of GPU resources for GPUaaS, according to an embodiment of the invention.

Illustrative embodiments of the invention will now be explained in further detail with regard to systems and methods for implementing a GPU service platform that is configured to provide topology aware grouping and provisioning of GPU resources. For example, FIG. 1 is a high-level schematic illustration of a computing system 100 which implements a GPU service platform that is configured to provide topology aware grouping and provisioning of GPU resources for GPUaaS, according to an embodiment of the invention. The computing system 100 comprises a plurality (n) of client systems 110-1, 110-2, . . . , 110-n (collectively referred to as client systems 110), and a server cluster 120 (e.g., server farm) comprising a plurality (s) of GPU servers 120-1, 120-2, . . . , 120-s. The client systems 110 and server cluster 120 are operatively connected over a communications network 130. The communications network 130 is configured to enable network communication between the client systems 110 and the server cluster 120, as well as to enable peer-to-peer network communication between the GPU servers 120-1, 120-2, . . . , 120-s of the server cluster 120. The computing system 100 further comprise a global GPU server allocation and scheduling system 140, which is configured to manage and schedule provisioning of multiple GPU resources over multiple GPU servers in the sever cluster 120 for a client system which requires access to a relatively large number of GPU devices which cannot be provisioned to the client system using GPU devices 124 on a single GPU server in the server cluster 120.

While the communications network 130 is generically depicted in FIG. 1, it is to be understood that the communications network 130 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 130 in some embodiments comprises combinations of multiple different types of communications networks each comprising network devices configured to communicate using Internet Protocol (IP) or other related communication protocols. The network 130 comprises intermediate points (such as routers, switches, etc.) and other elements that form a network backbone to establish communication paths and enable communication between network endpoints.

Furthermore, while FIG. 1 provides a generic illustration of a server cluster 120, it is to be understood that the server cluster 120 can be implemented as part of a private or public computing platform (e.g. cloud computing system, online social network). For example, the server cluster 120 can be implemented in a data center or as part of an enterprise network of a private or public cloud computing system. Furthermore, the GPU servers 120-1, 120-2, ..., 120-s may implement one of many types of commercially available server systems including, but not limited to, a Windows server, a Sun Solaris server, an HP server, a Linux server, etc. The sever cluster 120 can be a constituent component of a data center or cloud computing platform that performs data computing and data storage functions to support one or more network applications and/or on-line services that deliver consumer or business applications and services to multiple end users, service providers, and/or organizations.

The client systems 110 comprise various types of computing devices such as desktop computers, laptop computers, electronic tablets, etc. In another embodiment, the client systems 110 may comprise servers in a data center. As shown in FIG. 1, the client systems 110-1, 110-2, ..., 110-n each host a respective GPU-accelerated application 112-1, 112-2, ..., 112-n (collectively, GPU-accelerated applications 112), and a GPU application programming interface (API) 114. As further shown, the GPU servers 120-1, 120-2, ..., 120-s each comprise a topology aware GPU grouping and provisioning system 122 and one or more GPU devices 124. In accordance with embodiments of the invention, GPU provisioning techniques do not assume specific hardware configurations of GPU server nodes. Instead, the topology aware GPU grouping and provisioning system 122 running on a given GPU server node is configured to dynamically detect the hardware interconnect topology of the given GPU server node, and dynamically form a group of GPU resources that is allocated to a client system requesting access to GPU resources on the given node, wherein the GPU group is dynamically formed and allocated based on factors such as, e.g., a level of anticipated performance associated with the dynamically formed group, a connection port (e.g., network adapter of the GPU server) which is used by the client to access the GPU devices on the GPU server, configurable policies (e.g., service level agreement (SLA) policies) based on, e.g., quality of service (QoS), performance cost, current GPU load, etc.

The GPU-accelerated applications 112 comprise application programs having compute-intensive portions or routines (e.g., compute kernels) which are included within the program code of the GPU-accelerated applications 112, and which are offloaded to a GPU server in the server cluster 120 for accelerated computing. It is to be understood that the term "GPU-accelerated application" as used herein refers to any type of software application, including desktop applications, server applications, database applications, and mobile applications, which comprise executable GPU-related program code that is compiled for processing by high throughput accelerators such as GPUs.

The GPU APIs 114 of the client systems 110 comprise library functions and protocols that are configured to communicate with the GPU servers 120-1, 120-2, ..., 120-s of the server cluster 120 to access the GPU processing services provided by server cluster 120. For example, the GPU APIs 114 are configured to transmit service requests to the GPU servers 120-1, 120-2, ..., 120-s to access GPU processing services provided by the GPU servers within the server cluster 120. The service requests are transmitted along with blocks of application code (e.g., compute kernels) of the GPU-accelerated applications 112 and any associated data, for processing by one or more GPU devices 124 of one or more GPU servers of the server cluster 120. In addition, the GPU APIs 114 comprise routines to handle local GPU-related processing such as executing GPU application code, manipulating data, handling errors, etc.

In one embodiment, the GPU APIs 114 are implemented as extensions to commercially available GPU API platforms, such as CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In one embodiment of the invention, the GPU APIs 114 comprise "shim" layers of a standard, commercially available API. As is known in the art of computer programming, a shim layer is a library that transparently intercepts API calls and modifies arguments that are passed for a given operation, handles the operation itself, or redirects the operation to another entity. In this regard, the GPU APIs 114 may comprise shim layers that are utilized to extend the functionality of an existing API (e.g., CUDA) to implement the functionalities of the GPU APIs 114.

For example, while a GPU-accelerated application is executing on a client system, a determination is made as to whether a current block of program code to be executed comprises GPU-related code. If the current block of program code is not GPU-related code, the GPU-accelerated application passes the block of program code to a local processor (e.g., CPU) to execute the current block of program code. On the other hand, if the current block of program code is GPU-related code, the GPU-accelerated application passes the GPU-related code to the associated GPU API 114. The GPU API 114 determines whether the GPU code can be handled locally by the GPU API 114. For example, for static requests (e.g., error checking) that do not need GPU resources of the GPU server cluster 120, the GPU API 114 can locally process such request and return results to the GPU-accelerated application executing on the client system, thereby reducing communication overhead. On the other hand, if it is determined that the GPU API 114 cannot locally process the current block of GPU-related code, the GPU API 114 will generate and transmit a GPU service request to one of the GPU servers within the server cluster 120, or to the global GPU server allocation and scheduling system 140, wherein one or more GPU devices 124 residing on one or more GPU servers within the server cluster 120 will be allocated for processing GPU processing tasks associated with the GPU service request received from the client system. The process of generating and transmitting the GPU service request, and the resulting GPU server allocation and remote GPU processing operations, are all performed transparent to the client system.

In one embodiment of the invention, each of the GPU servers 120-1, 120-2, . . . , 120-s within the server cluster 120 can manage the scheduling and execution of pending GPU processing tasks from multiple client systems using queue-based GPU virtualization and management systems and methods as disclosed in commonly assigned U.S. patent application Ser. No. 15/391,223, filed on Dec. 27, 2016, entitled "Queue-Based GPU Virtualization and Management System," the disclosure of which is incorporated herein by reference. A queue-based GPU virtualization and management system allows the client systems 110 to share the GPU devices 124 a given GPU server node temporally and/or spatially. For example, in one embodiment, the utilization of the GPU device is shared temporally, wherein a given GPU device can be allocated to two or more client systems, and wherein the tasks of the two or more client systems are executed on the same allocated GPU device at different times. In another embodiment, a given GPU device can be allocated to two or more client systems such that utilization of the given GPU device is shared spatially, wherein the different tasks of the two or more client systems are concurrently executed on the given GPU device using different regions (threads, cores) of the given GPU device.

For a multi-GPU sever node allocation wherein multiple GPU devices 124 across multiple GPU server nodes in the server cluster 120 are allocated to a given client system, the global GPU server allocation and scheduling system 140 is configured to communicate with the GPU server nodes to provision GPU resources, allocate master and slave GPU server nodes, and command the allocated GPU server nodes to logically bind together and establish communication links to conduct peer-to-peer operations for executing the GPU processing tasks associated with the client request. Such techniques are disclosed in commonly assigned U.S. patent application Ser. No. 15/487,887, filed on Apr. 14, 2017, entitled "Managing Access to a Resource Pool of Graphics Processing Units Under Fine Grain Control," the disclosure of which is incorporated herein by reference. With such techniques, a given client system will see a larger logical GPU server node, while a master GPU server node coordinates and manages execution of the GPU processing tasks across all of the allocated GPU server nodes with fine grain control, transparently to the client system.

Figure 2:
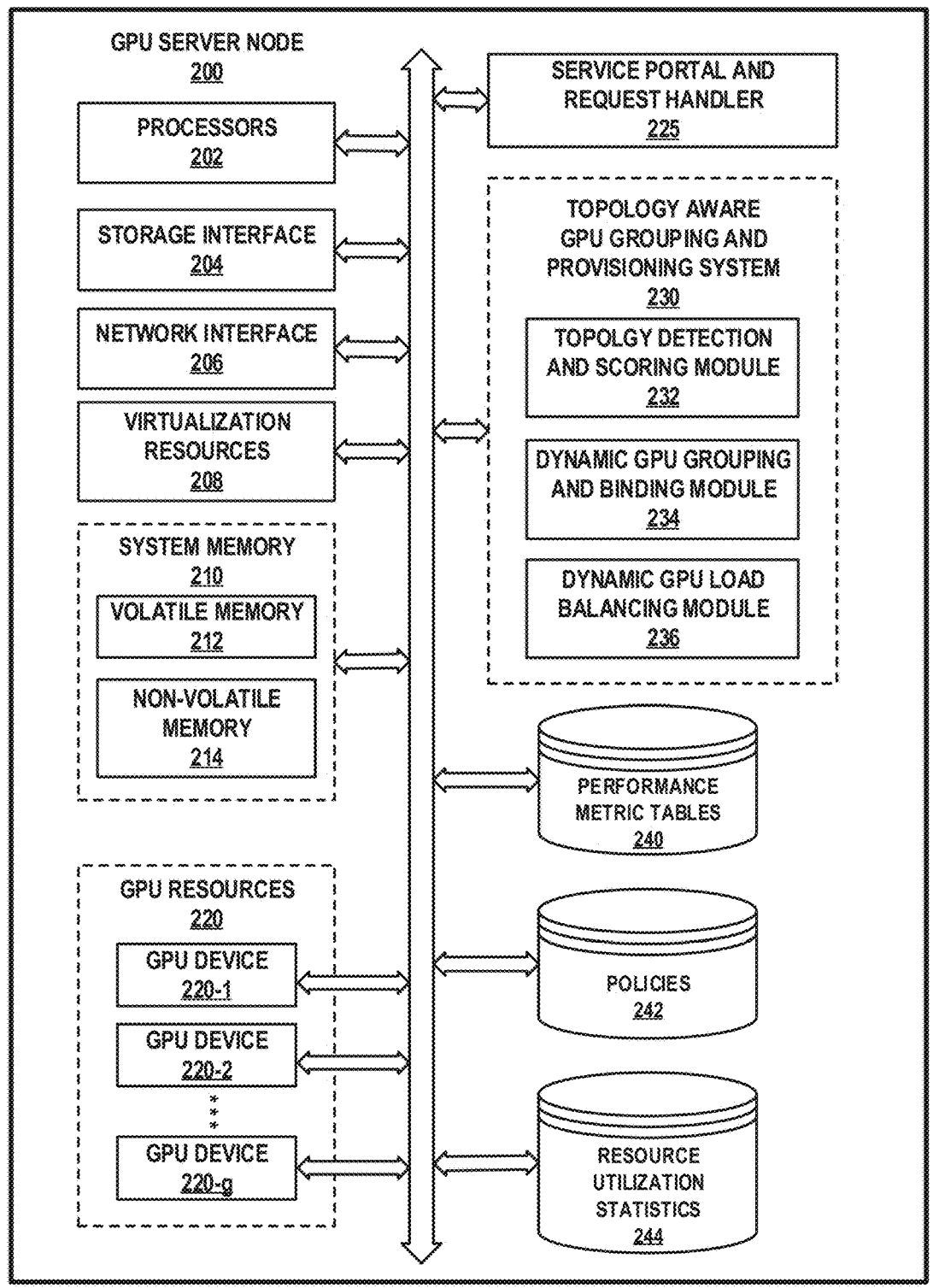
FIG. 2 schematically illustrates an embodiment of a GPU server node of the GPU service platform of FIG. 1, according to an embodiment of the invention.

FIG. 2 schematically illustrates a server system which is implemented in the computing system of FIG. 1, according to an embodiment of the invention. More specifically, FIG. 2 shows an embodiment of a GPU server node 200 that is configured to provide topology aware grouping and provisioning of GPU resources for GPUaaS, according to an embodiment of the invention. The GPU server node 200 comprises multiple processors 202, storage interface circuitry 204, network interface circuitry 206, virtualization resources 208, system memory 210, GPU resources 220, a service portal and request handler 225, a topology aware GPU grouping and provisioning system 230, a data store of performance metric tables 240, a data store of policies 242 (e.g., GPU binding policies, SLA polices, etc.), and a data store of GPU server resource utilization statistics 244. The system memory 210 comprises volatile memory 212 and non-volatile memory 214. The GPU resources 220 comprise one or more GPU devices 220-1, 220-2, . . . , 220-g. The topology aware GPU grouping and provisioning system 230 comprises a topology detection and scoring module 232, a dynamic GPU grouping and binding module 234, and a dynamic GPU load balancing module 236.

In one embodiment, the various system modules 225, 230, 232, 234, and 236 comprise software modules that are persistently stored in a storage device and loaded into the system memory resources (e.g., volatile memory 212 and/or non-volatile memory 214), and executed by the processors 202 to perform various functions as described herein. In this regard, the system memory 210 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 202 may comprise one or more processors that are configured to process program instructions and data to execute a native operating system (OS) and applications that run on the GPU server node 200. For example, the processor may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 enables the processors 202 to interface and communicate with the system memory 210, and other local storage and off-infrastructure storage media on the GPU server node 200, using one or more standard communication and/or storage control protocols to read data from or write data to volatile and non-volatile memory/storage devices. The network interface circuitry 206 enables the GPU server node 200 to interface and communicate with a network and other system components. The network interface circuitry 206 may comprise conventional transceivers of a type well known in the art (e.g., network interface cards, input/output ("I/O") adaptors, etc.).

The virtualization resources 208 can be instantiated to execute one or more applications or functions which are hosted by the GPU server node 200. For example, the virtualization resources 208 can be configured to implement the various modules and functionalities of the topology aware GPU grouping and provisioning system 230. In one embodiment, the virtualization resources 208 comprise virtual machines that are implemented using a hypervisor platform which executes on the GPU server node 200, wherein one or more virtual machines can be instantiated to execute functions of the GPU server node 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the GPU server node 200, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server node 200. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processors 202 to execute a native operating system and one or more applications hosted by the GPU server node 200, and to temporarily store data that is utilized and/or generated by the native OS and application programs running on the GPU server node 200. For example, the volatile memory 212 of the system memory 210 may be a dynamic random-access memory (e.g., DRAM) or other forms of volatile random-access memory. The non-volatile memory 214 may comprise a storage-class memory (SCM) that is accessible as a memory resource. For example, the non-volatile memory 214 may be a NAND Flash storage device, a SSD (solid state drive) storage device, or other types of next generation non-volatile memory (NGNVM) devices.

The service portal and request handler 225 implements interfaces and functions to enable client/server communication between the client systems 110 and the GPU server node 200. In addition, service portal and request handler 225 comprises methods to communicate with, and pass incoming service requests for GPU services from the client systems 110 to the topology aware GPU grouping and provisioning system 230, the functions of which will be described in further detail below.

The techniques discussed herein with regard to implementing topology aware grouping and provisioning of GPU resources to support GPUaaS according to embodiments of the invention enable GPU server nodes to select and provision a proper number and configuration of GPU resources for a given client to maximize performance for the given client. These techniques are significantly advantageous in practice since it has been determined through experimentation that different GPU cards of the same technology (e.g., such as the Tesla K80, M40, P100 GPU card technologies) can deliver dramatically different performances (a 2× (or greater) reduction in performance for certain operations such as GPU feeding, Host-to-Dev, GPU reading, or Dev-to-Host operations, etc.) in state-of-the-art X86 servers and networking connections (such as 100 Gb remote direct memory access (RDMA) adaptors) due to, e.g., the NUMA (non-uniform memory access) platform and cross-socket design for connecting CPUs in the topology. The differences in GPU performance are largely due to the hardware properties and configurations, for example, the types and numbers of HBAs (host bus adapters) or network interface controllers (NICs), and the interconnection topology (e.g., Peripheral Component Interconnect Express (PCIe), NVLINK, etc.) the hardware devices (e.g., between the GPUs and/or CPUs). As such, accessing similar GPUs in the same host may result in completely different performance profiles. These performance differences will be illustrated with regard to different hardware topologies of a server node as schematically shown in FIGS. 3A, 3B and 3C.

Figure 3A:
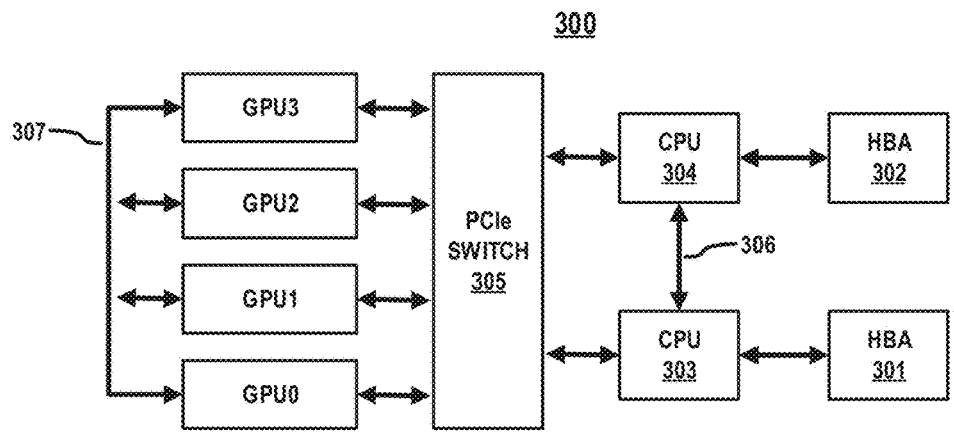
FIGS. 3A, 3B, and 3C are high-level schematic illustrations of different hardware architectures which can be implemented in a GPU server node.

For example, FIG. 3A schematically illustrates a hardware topology of a GPU server node 300 which comprises a first HBA 301, a second HBA 302, a first multicore CPU 303, a second multicore CPU 304, a PCIe switch 305, and a plurality of GPU cards GPU0, GPU1, GPU2, and GPU3. The CPUs 303 and 304 are electrically and mechanically connected to a motherboard using CPU sockets, as is known in the art. The CPUs 303 and 304 can be configured in a cluster using the NUMA cluster configuration technology, which allows the CPUs 303 and 304 to share local memory and an I/O bus or data path via SMP (symmetric multiprocessing). A socket-level link 306 between the CPUs 303 and 304 can be implement using a QuickPath Interconnect (QPI) point-to-point processor interconnect technology. The PCIe switch 305 is used between the CPUs 303 and 304 and the four GPUs GPU0, GPU1, GPU2, and GPU3 to allow direct GPU-CPU communication between the CPUs and any of the GPUs. The GPUs GPU0, GPU1, GPU2, and GPU3 can be interconnected 307 using any suitable wire-based communications protocol such as NVLINK developed by NVidia. NVLINK allows for transferring of data and control code between the GPUs, and can also be used for communication between the GPUs and CPUs.

Figure 3B:
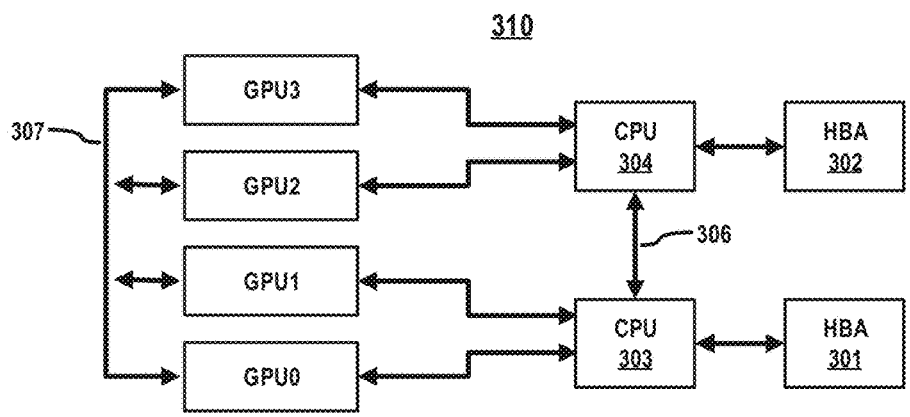

FIG. 3B schematically illustrates a hardware topology of a GPU server node 310 which is similar to the hardware topology of FIG. 3A, except that in FIG. 3B, the first CPU 303 is directly connected to the first and second GPUs (GPU0 and GPU1) via a PCIe switch and/or PCIe host bridge (not specifically shown), and the second CPU 304 is directly connected to the third and fourth GPUs (GPU2 and GPU3) via a PCIe switch and/or PCIe host bridge (not specifically shown). With this topology, the GPUs are split into two domains attached to different CPU sockets. Further, FIG. 3C schematically illustrates a hardware topology of a GPU server node 320 which is similar to the hardware topology of FIG. 3B, except that in FIG. 3C, only one HBA 301 is used, which is connected to the CPU socket of the first CPU 303.

Figure 3C:
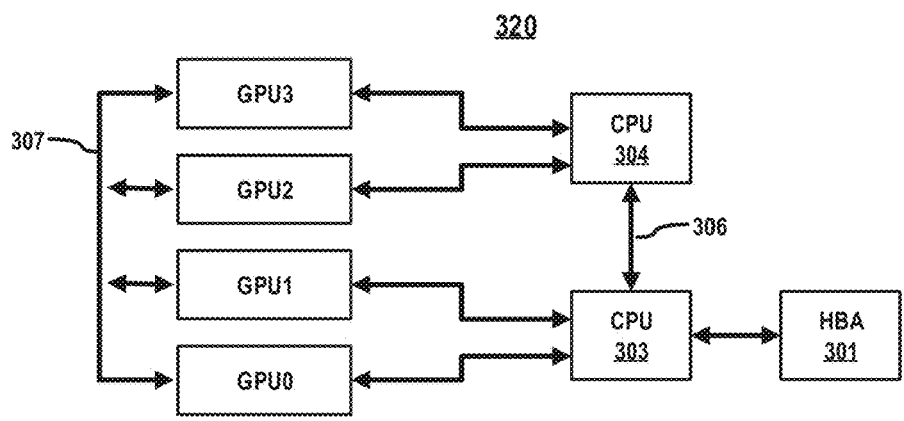

With the different hardware topologies shown in FIGS. 3A, 3B, and 3C, it has been determined that a most optimal performance can obtained when the HBA and GPUs are connected to the same CPU socket node, and that a least optimal performance may be obtained when the HBA and GPU are not connected to the same CPU socket node. For instance, the topology of FIG. 3A provides a high-performance configuration primarily due to the PCIe switch 305 which can be implemented with a large number of data-transmission lanes, e.g., 96 lanes, for high bandwidth communications. Further, the topology of FIG. 3C provides a low-performance configuration when using the HBA 301 to connect to GPU2 and GPU3. With the topology of FIG. 3B, for example, when two or more GPUs and an HBA are commonly connected to the same CPU socket (e.g., HBA 301 connected to GPU0 and GPU1 through the CPU socket of CPU 303, and the HBA 302 connected to GPU2 and GPU3 through the CPU socket of CPU 304), system performance (as seen by a given client) using the two or more GPUs connected to the same HBA can be unpredictable depending on how many tasks are assigned among GPUs and how much data is being transmitted between the GPUs.

In accordance with embodiments of the invention, GPU provisioning techniques do not assume specific HW topology configurations of GPU server nodes. Instead, the topology aware grouping and GPU provisioning methods discussed herein are configured to detect the HW interconnect topology of a GPU server node, and then dynamically form a GPU group of GPU devices (on the fly) to allocate to the client based on various factors as will be discussed in further detail below.

Furthermore, GPU provisioning systems and methods according to embodiments of the invention are geared to optimize the use of GPU resources of a given GPU server node in circumstance where multiple clients can share a GPU server with multiple GPU devices. A GPUaaS computing system according to an embodiment of the invention is configured to export one or more GPUs as manageable resources in a pool of GPU resources. Since it is not common to power-off specific GPUs residing in a same GPU server node, GPU provisioning techniques as discussed herein are configured to achieve high aggregated performance (and avoid performance bottlenecks) by supporting efficient load balancing of client tasks across multiple GPUs which reside on one GPU server node, or across two or more GPU server nodes. In addition, GPU provisioning methods take into account service requests from client applications that expressly request use of a single GPU device or multiple GPU devices to handle computing tasks associated with the client service requests.

A straightforward solution for provisioning GPU resources on a given GPU server node would be to bind specific client(s) to specific GPU(s) in a static fashion, but such static solution would most likely result in degraded system performance or low GPU utilization given that it is has been determined through experimentation that improper multi-GPU resource assignment consumes more resources than necessary and degrades performance. Indeed, the static binding of a client to specific GPUs of a GPU server node can result in overloading of the allocated GPUs, and prohibits the ability to exploit the computational power of using multiple GPUs in a balanced manner. Furthermore, a static mapping would ignore the HBA and GPU connection topology, such that a significant loss in performance could result from having to transferring requests over a socket-link between CPUs to access GPU devices that may be located within an interconnect domain that is not directly linked to the HBA (or network adapter card) of the GPU sever node to which the client connects to access the GPU resources of the GPU server node.

To address these issues in a shared multi-GPU computing environment, systems and methods according to embodiments of the invention are configured to intelligently provision GPU resources according to various factors including, but not limited to, the topology of GPU interconnection, the NIC used by the client to connect to the GPU server node and the CPU socket to which the NIC is linked, etc., to provide higher performance and utilization of shared GPU resources. As explained in further detail below, provisioning methods are configured to dynamically group GPUs together such that most or all of the GPUs within a GPU group belong to a same interconnect domain to provide much faster communication, while avoiding the formation of GPU groups that require cross-domain interconnections, which can result in degraded performance. In addition, GPU provisioning methods according to embodiments of the invention are configured to dynamically bind a client to a proper GPU group, such that the client can be re-connected to a different RDMA network adaptor of the GPU server node to access target GPU resources within the allocated GPU group for optimized performance. The term "dynamically" as used herein refers to provisioning functionalities that include (1) detecting the interconnection topology per GPU server node (2) utilizing performance metrics to score the interconnection topology of each GPU server node and (3) dynamically determining a sufficient GPU grouping for a given client when a service request is received from the client for GPU resources (there is no pre-defined group number for a given client) based on, e.g., the performance metrics/scores of the interconnection topology. In addition, the dynamic grouping of multiple GPUs for a given client can be performed based on a current or historical load profile of the GPU resources within a given GPU server node. Various functions of the system modules 225 and 230 (FIG. 2) will now be discussed in further detail.

The service portal and request handler 225 (FIG. 2) provides methods supporting GPUaaS and allowing GPU resources 220 residing on the GPU server node 200 to be exported as a service URL (IP:port). In a multi-GPU server node system as shown in FIG. 1, the service portal and request handler 225 of a given GPU sever node will communicate and coordinate with the global GPU server allocation and scheduling system 140 to provide cluster wide optimized GPU allocation and task scheduling, as well as track and aggregate various metrics, GPU resource assignments and usage, etc., which are utilized by an automated billing system to properly bill clients for GPUaaS services.

In one embodiment of the invention, the topology aware GPU grouping and provisioning system 230 comprises a software platform that sits on top of low-level hardware driver and/or library layers which manage the hardware (GPU hardware cards, networking adaptors, CPU nodes, etc.) of the GPU server node 200. The topology detection and scoring module 232 implements methods that are configured to (i) detect the hardware elements (and properties) (e.g., GPUs, network adapters (IB, RoCE, IPoIB, Ethernet) and the hardware interconnect topology (e.g., PCIe, NVLink, other internal interconnection bus/link technologies, etc.), and (ii) generate a topology performance metrics table that is stored in the data store of performance metric tables 240. The topology detection and scoring module 232 would detect the hardware environment and interconnect topology for a given GPU server node, and generate a performance metrics table which includes performance metrics (e.g., priority scores) for the detected hardware environment and interconnect topology, and then store the performance metrics table in the data store 240 for subsequent access and use in GPU mapping/re-balancing operations. The functionalities of the topology detection and scoring module 232 will be discussed now in further detail with reference to the flow diagram of FIG. 4.

Figure 4:
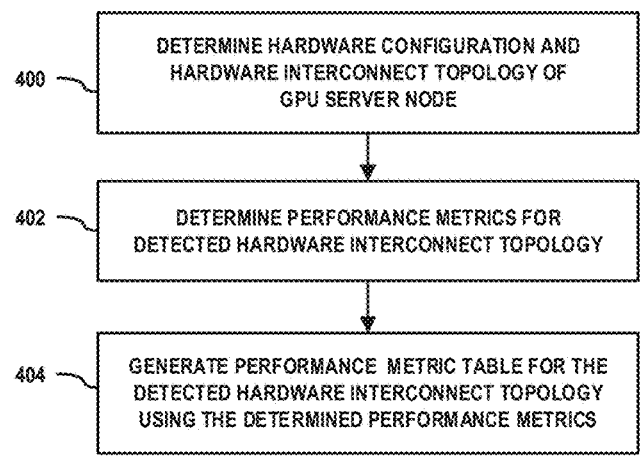
FIG. 4 is flow diagram of a method for detecting a hardware configuration and interconnect topology of a GPU server node and scoring the detected interconnect topology, according to an embodiment of the invention.

In particular, FIG. 4 is flow diagram of method for detecting a hardware configuration and interconnect topology of a GPU server node and scoring the detected interconnect topology, according to an embodiment of the invention. In general, the method of FIG. 4 comprises determining a hardware configuration and hardware interconnect topology for a GPU server node (block 400), determining performance metrics (e.g., priority scores) for the detected hardware interconnect topology (block 402), and generating a performance metric table for the detected hardware interconnect topology using the determined performance metrics (e.g., priority scores) (block 404). As noted above, the system topology refers to how the PCI-Express devices (GPUs, InfiniBand HCAs, storage controllers, etc.) connect to each other and to the system's CPUs.

In one embodiment of the invention, the hardware configuration and hardware interconnect topology for a GPU server node can be determined (in block 400) by analyzing the layer of low-level system drivers. As noted above, there are static hardware factors that can impact performance GPU services provided by GPU server node, such as the types of GPUs implemented in the GPU server node, the manner in which the GPUs are connected to CPUs and other GPUs, the distance of the communication path between a GPU and a network adapter (e.g., NIC, HBA), etc. The hardware information and interconnect topology detection process can be implemented by composing and analyzing device/system cmd-query results, typically via low-level HW drivers, library or APIs. For example, NVidia GPU has CUDA API and utilities such as the System Management Interface (nvidia-smi) (which is a command line utility) which can detect GPU devices on a given GPU server node, along with corresponding interconnect paths between the GPU devices and other hardware components of the given GPU server node. Moreover, for CPUs, command utilities such as lscpu, numactl, etc., can be used to determine information regarding the CPU architecture (number of CPUs, threads, cores, sockets, NUMA nodes, CPU caches vendor, family, model, etc.) present on the given GPU server node. Moreover, utilities such as lspci, Mellanox OpenFabrics Enterprise Distribution (OFED), and vendor specific cmds can be used to determine information regarding network adapters (NICs, HBAs, etc.) that are implemented in a given GPU server node.

Figure 5:
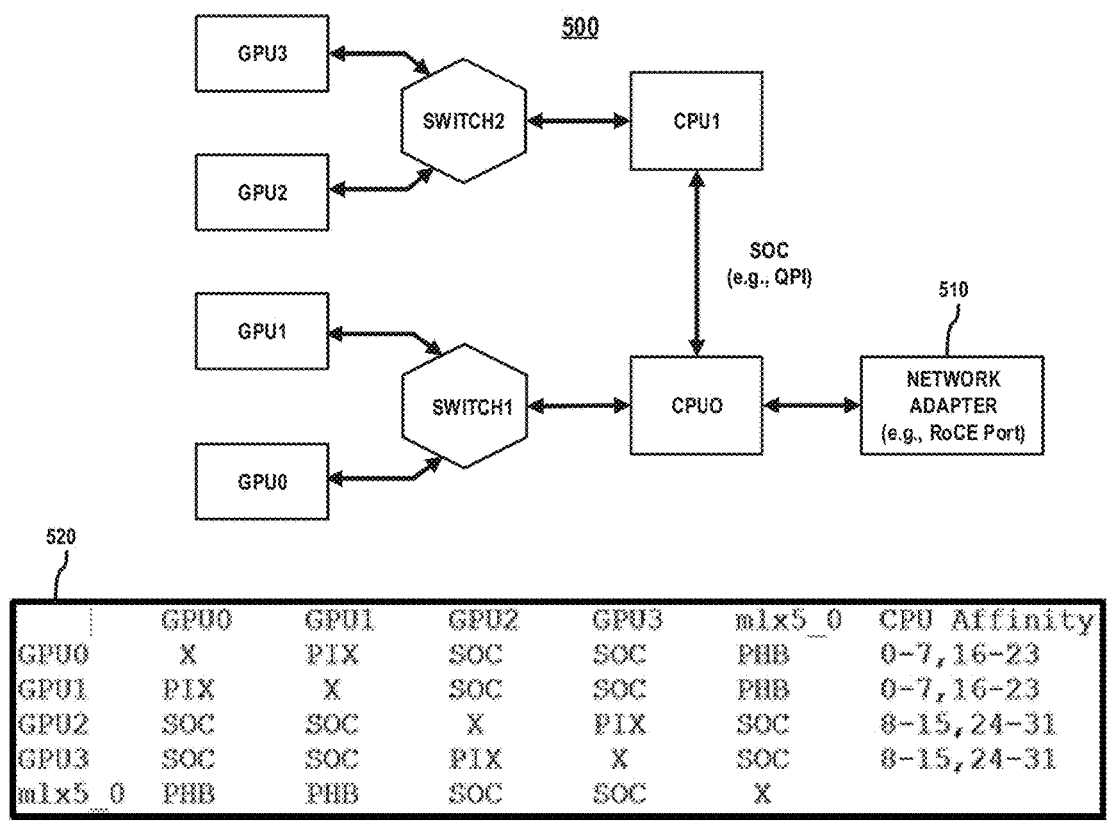
FIG. 5 illustrates an example hardware topology of a GPU server node, and a corresponding system topology view generated by a topology detection and scoring module, according to an embodiment of the invention.

FIG. 5 illustrates an example hardware topology of a GPU server node 500, and a corresponding system topology view 520 generated by the topology detection and scoring module 232 using a topology detection command utility, according to an embodiment of the invention. As schematically illustrated in FIG. 5, the hardware topology of the GPU server node 500 comprises a network adapter 510, first and second CPUs (CPU0 and CPU1), first and second switches (SWITCH1 and SWITCH2), and a plurality of GPU devices (GPU0, GPU1, GPU2, and GPU3). In the illustrative embodiment of FIG. 5, it is assumed that the network adapter 510 is implemented using a RDMA over Converged Ethernet (RoCE) network card (which allows remote direct memory access (RDMA) over an Ethernet network), that the first and second switches (SWITCH1 and SWITCH2) comprise internal PCIe switches, and that the first and second CPUs (CPU0 and CPU1) are interconnected using a socket-level interconnect such as QPI.

The system topology view 520 illustrated in FIG. 5 provides information regarding the interconnect paths between the GPU devices (GPU0, GPU1, GPU2, and GPU3) and between the network adapter 510 and the GPU devices (GPU0, GPU1, GPU2, and GPU3). In the system topology view 520, the term X denotes self, other terms as defined as set forth in the following table:

TABLE 1

| CONNECTION TYPE | DESCRIPTION |
| --- | --- |
| NVLINK | Interconnect Path Includes NVLINK |
| PIX | Interconnect Path Includes Internal PCIe Switch |
| PXB | Interconnect Path Includes Multiple Internal PCIe Switches |
| PHB | Interconnect Path Includes PCIe Host Bridge |
| SOC | Interconnect Path Includes Socket-Level Link (e.g., QPI) |

The system topology view 520 includes information which indicates that: (i) 4 GPUs were detected in the example topology 500; (ii) GPU0 and GPU01 are interconnected via an internal PCIe switch (PIX) with a CPU affinity to NUMA socket 0 (CPU0-7, 16-23), connected with Mellanox RoCE (single port) (mlx5_0) via host PCIe switch (PHB); and that (iii) GPU2 and GPU3 are interconnected via an internal PCIe switch (PIX), with a CPU affinity to NUMA socket1, with a long communication path between the Mellanox RoCE card and GPU2/GPU3.

In one embodiment of the invention, a configurable priority scoring scheme is implemented by the topology detection and scoring module 232 to quantify a performance of the different connection types set forth in the above TABLE 1. In particular, a configurable scoring or priority scheme is utilized to provide a performance metric of a given interconnect type with regard to factors such as speed and interconnect distance, wherein a lower value of a priority score denotes an interconnect path closer in distance and/or faster in performance, whereas a larger value of a priority score denotes an interconnect path further in distance and/or slower in performance. For example, NVLink is much faster than PCIe G3, so an NVLink connection type is accorded a top priority (although such score is configurable as an NVLink connection can exhibit a cross-chassis behavior which is different that an in-chassis behavior). Furthermore, a GPU/NIC interconnect path that includes a SOC connection (across a QPI link between CPUs) exhibits a significant loss in performance and is therefore accorded a priority score based on a large penalty. By way of further example, the scoring method can be expanded by not only evaluating the bus/interconnection types, but also the actual or theoretical operating characteristics or metrics of the HW and/or given HW generation. For example, a metric may include a theoretical maximum operating frequency for PCIe G2/G3/G4 or an actual operating bandwidth of such HW operating in the GPU server node, etc.

Next, FIGS. 6A and 6B schematically illustrate methods for determining priority scores (or more generally, performance metrics) for the detected hardware interconnect topology (block 402, FIG. 4), and for generating a performance metrics table for the detected hardware interconnect topology using the determined priority scores (block 404, FIG. 4.). In general, FIG. 6A illustrates a data structure 600 which comprises configurable performance metrics for different types of possible connections in a given GPU server topology, according to an embodiment of the invention. More specifically, the data structure 600 comprises predefined (yet configurable) priority scores for the different types of possible connections as discussed above in conjunction with TABLE 1. As shown in FIG. 6A, a highest priority (priority=1) is accorded to a NVLink type connection that exists in a GPU interconnect path, while a lowest priority (priority=10) is accorded to a GPU interconnect path that includes a SOC type connection.

Next, FIG. 6B illustrates a performance metrics data structure which comprises performance metrics associated with a detected interconnect topology of GPU devices and hardware components of a given GPU sever node, according to an embodiment of the invention. In particular, FIG. 6B illustrates an example metric table 610 which is generated by incorporating the priority scores shown in the table data structure 600 of FIG. 6A into the topology view 520 shown in FIG. 5. The performance metrics table 610 can be generated by overwriting the connection types (i.e., PIX, SOC, and PHB) in the topology view 520 of FIG. 5 with the associated priority scores shown in FIG. 6A, which in the example embodiment includes PIX=2, PHB=5, and SOC=10.

The performance metrics table 610 provides an indication of the performance (e.g., speed) of a given interconnect between two GPU devices or between a GPU and a network adapter, for example. In one embodiment of the invention, the information contained in the performance metric table 610 is a primary factor that is used for dynamic GPU grouping and binding based on client SLA policies or GPU binding policies of the given GPU server platform, along with secondary factors such as GPU load statistics, etc. Such metrics allow for dynamic formation of a "Virtual GPU Group (VGG)" on the fly. The priority score values in the metric table 610 are configurable values that can change over time, in which case performance metrics tables can be updated with newly configured priority scores (or more generally, performance metrics) for one or more interconnect types, and then subsequently used for GPU binding and balancing purposes with newly defined performance metrics (e.g., priority score values).

Referring back to FIG. 2, the dynamic GPU grouping and binding module 234 implements methods that are configured to bind a new GPU consumer/client (usually over fabric) to a specific GPU Group based on various factors as discussed herein (e.g., interconnect performance metrics for a given interconnect topology of a GPU server node, load status, configuration policies for initial request handling, etc. As noted above, GPUs are not grouped in a static fashion (such as predefined GPU group numbers), but rather the GPU configuration/interconnection is characterizes based on metric priority scores (and other factors) to dynamically group GPUs for a given client connected to a given NIC port, and based on an SLA policy. The system could have multiple GPU groups, where a given GPU can belong to different GPU groups (to different clients) simultaneously (as GPU is shared). There are two extreme grouping scenarios—each GPU on a given GPU server node forms a group, or every GPU on the given GPU server node belongs to the same group. In addition, information regarding dynamically formed GPU groups and GPU membership in GPU groups can be collected and maintained on the fly during real-time operation (i.e., via NVidia utilities or APIs), wherein such information can be used to generate resource usage metrics including memory usage, core occupation etc. Such metrics can be used for (i) load balancing across GPUs, (2) counting and billing purposes, and for (iii) cluster wide GPU allocation and load balancing by the global GPU server allocation and scheduling system 140 (FIG. 1) across the server cluster 120 of GPU server nodes.

Figure 7:
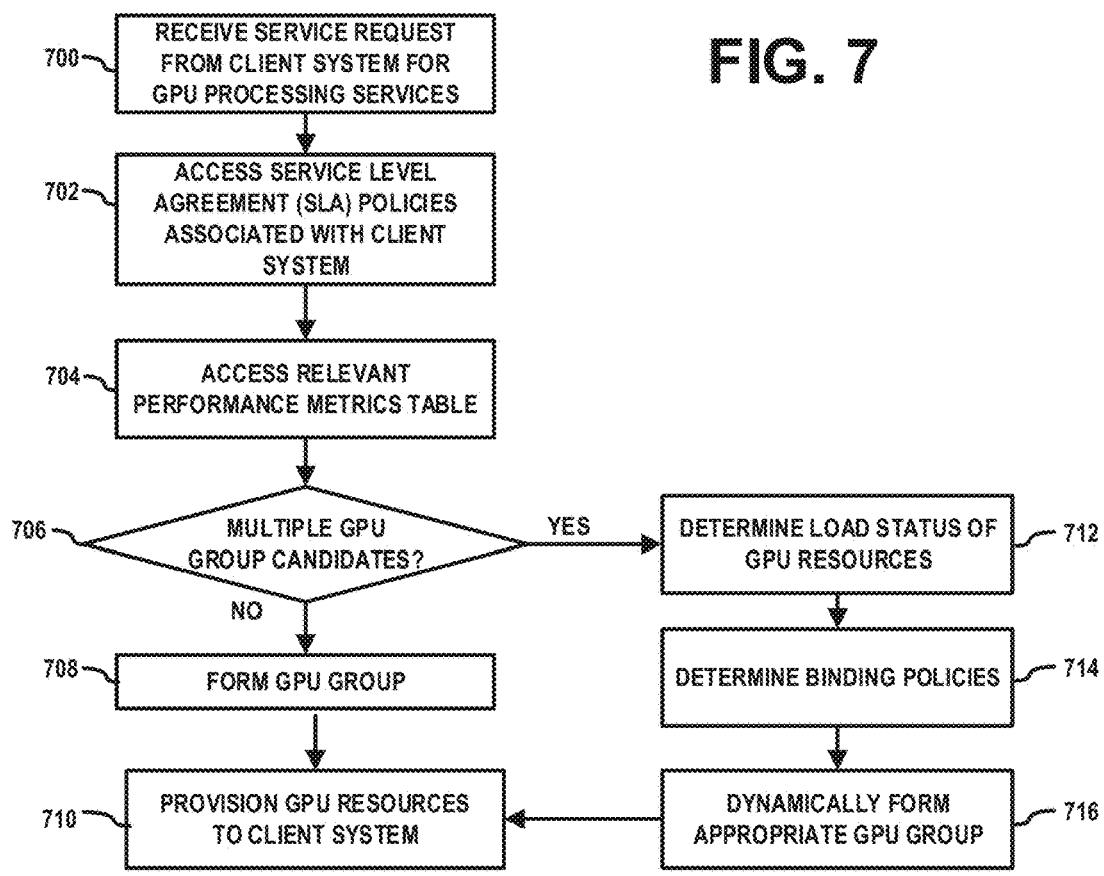
FIG. 7 is a flow diagram of a method for dynamically grouping and binding GPU resources, according to an embodiment of the invention.

FIG. 7 is a flow diagram of a method for dynamically grouping and binding GPU resources, according to an embodiment of the invention. In one embodiment of the invention, the method of FIG. 7 illustrates operating modes of the dynamic GPU grouping and binding module 234 of the topology aware GPU grouping and provisioning system 230 shown in FIG. 2. As an initial stage of the GPU provisioning workflow of FIG. 7, a GPU server node will receive a service request from a client system for GPU processing services (block 700). The dynamic GPU grouping and binding module 234 will then access SLA policies (in the policies data store 242) which are associated with the requesting client system (block 702) and access one or more relevant performance metrics tables from the data store of performance metrics tables 240 (block 704).

Based on the information contained in the accessed performance metrics table and SLA policies, the dynamic GPU grouping and binding module 234 will map SLA polices to associated performance metrics in the performance metrics table. For example, there may be four (4) SLA policies such as (i) Top, (ii) High, (iii) Medium, and (iv) Sufficient, wherein each policy maps to at least one of the current metric table priority scores (e.g., as shown in FIG. 6A). In the context of GPUaaS, GPUs could be concurrently shared by multiple clients, wherein different SLA levels could be supported, as an example, "Top" and "Exclusive", wherein a "Top" level means that GPUs can be shared with other clients. A new client may either map to existing GPUs or new GPUs, and there may be a mapping policy that defines the optimization behavior using techniques such as bin-packing, choose-the-first-available, reservation etc. The policy may also define actions that are taken when relevant GPUs are not available, e.g., queue the client service request and wait for GPU resources to become available, or automatically downgrade to a next level SLA to alleviate certain restrictions on GPU provisioning, etc.

When a new client requests access to the GPU resources of the GPU server node, the SLA policies and topology performance metric tables are queried to determine if there are any qualified GPU groups available to provision for the client based on the SLA policies for the client. If there is only a single GPU group available (negative result in block 706), the GPU group will be formed (block 708) and then provisioned to the requesting client (block 710). The relevant metadata will then be updated to denote which GPUs are occupied by which client at which SLA setting. Such metadata can be referenced for other client bindings.

On the other hand, if multiple GPU group candidates are available (affirmative determination in block 708), the processing load status (based on current load statistics or aggregated load statistics) of the different GPU groups can be determined (block 712) using information contained in the resource utilization statistics data store 244. In addition, the system can access and process relevant binding policies (block 714) within the SLA for the client, or predefined GPU platform binding policies, to determine, for example, if the client can share a GPU with another client. For example, if one or more GPUs in a given group are currently allocated to other clients, and the client SLA policies and/or system binding policies restrict or otherwise forbid the sharing of GPU resources, then the given GPU group is not deemed a candidate and another GPU group will be considered. Eventually, the system will dynamically form a GPU group for the requesting client, which meets the target policies (block 716) and the GPU group will be provisioned to the client (block 710). Again, depending on the SLA policies and/or binding policies of the GPU service platform, the client may be dynamically assigned to an existing shared GPU (for higher GPU utilization) or to a new GPU group (for higher performance).

Figure 8:
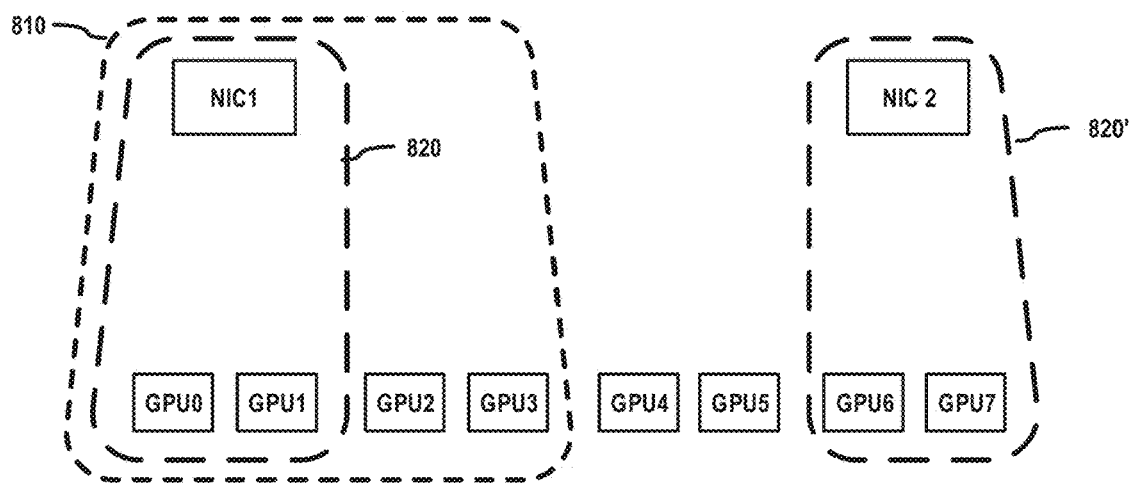
FIG. 8 schematically illustrates a method for dynamic GPU grouping and binding based on a client connection to a given network adaptor of a GPU server node.

It is to be noted that since a performance metrics table can include GPU-NIC interconnection scoring, a client (or application) may be assigned to a different GPU group depending on which one of multiple NICs of the GPU server that client is connected to, or otherwise reconnected to another NIC which results in optimized performance. For example, FIG. 8 schematically illustrates a method for dynamic GPU grouping and binding based on a client connection to a given network adaptor of a GPU server node. In particular, FIG. 8 schematically illustrates a scenario in which a given client application 810 connected to NIC1 issues a service request for four (4) GPUs, wherein an associated SLA policy specifies "high performance" but allows sharing of GPU resources with other client applications having similar SLA polices. In this situation, a GPU group is formed by GPU0, GPU1, GPU2, and GPU3.

Next, it is assumed that a second client application 820 connected to NIC1 issues a service request for two GPUs with the same SLA as the first client application 810. In this situation, another GPU group is formed and assigned to the second client application 820 which includes GPU0 and GPU1, which are part of the first GPU group assigned to the first client application 810. In this GPU allocation, higher GPU utilization is achieved by the overlapping GPU groups. If the second client application connects to the other network adapter NIC2, depending on its NUMA affinity, the reconnected client application 820' may be assigned to different GPUs, e.g., GPU6 and GPU7 which are closer in connection with the network adapter port NIC2.

Referring back to FIG. 2, the dynamic GPU load balancing module 236 implements methods which are configured to automatically balance an initial GPU resource initial assignment to a given client to achieve best possible performance. Depending on factors as discussed below, a new incoming client could be mapped to currently allocated GPU or GPU-group in the given GPU sever node, in a way that avoids single GPU or GPU-group bottleneck and improves overall utilization. In particular, when a new client connects to the GPU server node, the dynamic GPU load balancing module 236 will determine the status of existing client-GPU bindings, and determine the current or recent GPU load statistics (e.g., GPU utilization in a last predefined period). The dynamic GPU load balancing module 236 will then apply a balancing policy which will allow the new client to be assigned to GPU resources while balancing the GPU processing load. The balancing policy used can be pluggable, and may be, for example, a round-robin fashion for more balancing, or a least utilized or fewer connections for high priority users.

By default, a GPU Balancing Domain (a logical set of GPUs in which load balancing can be performed) may be defined as "All-GPU" in the given GPU server node. Several domains may be partitioned to isolate the load balancing behaviors, wherein each domain has a specific GPU or GPU-Group, and wherein each domain has a defined GPU grouping and load balancing policy. After an initial binding, a specific client would typically submit computing requests to the allocated GPU or GPU-group, whereby such affinity is not changed until the tasks associated with the computing requests are completed.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   receiving, by a graphics processing unit (GPU) server node, a service request from a client system for GPU processing services provided by the GPU server node, wherein the GPU server node comprises a plurality of GPU devices;
   determining a hardware interconnect topology of the GPU server node, the hardware interconnect topology comprising information regarding determined interconnect paths between the GPU devices of the GPU server node and between the GPU devices and hardware components of the GPU server node;
   accessing a performance metrics data structure which comprises performance metrics associated with a plurality of different interconnect path types that can be used to connect to GPU devices in a GPU server node topology, wherein the performance metrics comprise predefined priority scores that accord different priorities to the plurality of different interconnect path types;
   dynamically forming a group of GPU devices for handling the service request received from the client system based at least in part on the determined hardware interconnect topology of the GPU server node and the performance metrics, wherein the group of GPU devices is dynamically formed at least in part by selecting one or more GPU devices of the GPU server node which are determined to be interconnected with higher priority interconnect paths as compared to other GPU devices of the GPU server node which are determined to be interconnected with lower priority interconnect paths; and provisioning the dynamically formed group of GPU devices to the client system to handle the service request.

2. The method of claim 1, further comprising accessing one or more quality of service policies associated with the client system, wherein the group of GPU devices is dynamically formed based at least in part on the one or more quality of service policies associated with the client system.

3. The method of claim 1, wherein the performance metrics comprise a predefined priority score that is accorded to a type of interconnect path that is used to connect a GPU device and a network adapter which is utilized to connect to the GPU server node.

4. The method of claim 1, wherein the performance metrics comprise a predefined priority score that is accorded to a type of interconnect path that is used to connect two GPU devices of the GPU server node.

5. The method of claim 1, wherein the performance metrics comprise a predefined priority score that is accorded to a type of interconnect path which includes a processor socket-level link, wherein the priority accorded to the type of interconnect path which includes a processor socket-level link is lower than a priority accorded to a type of interconnect path which does not include a processor socket-level link.

6. The method of claim 1, further comprising:
generating a system topology data structure comprising information regarding the determined hardware interconnect topology of the GPU server node; and
populating the system topology data structure with priority information for the determined interconnect paths included in the system topology data structure based on the predefined priority scores of the performance metrics data structure.

7. The method of claim 1, wherein dynamically forming the group of GPU devices of the GPU server node comprises selecting one or more GPU devices that are already included as part of one or more other dynamically formed groups of GPU devices provisioned to other client systems.

8. An article of manufacture comprising a non-transitory processor-readable storage medium having stored therein program code of one or more software programs, wherein the program code is executable by a processor to implement a process comprising:
receiving, by a graphics processing unit (GPU) server node, a service request from a client system for GPU processing services provided by the GPU server node, wherein the GPU server node comprises a plurality of GPU devices;
determining a hardware interconnect topology of the GPU server node, the hardware interconnect topology comprising information regarding determined interconnect paths between the GPU devices of the GPU server node and between the GPU devices and hardware components of the GPU server node;
accessing a performance metrics data structure which comprises performance metrics associated with a plurality of different interconnect path types that can be used to connect to GPU devices in a GPU server node topology, wherein the performance metrics comprise predefined priority scores that accord different priorities to the plurality of different interconnect path types;
dynamically forming a group of GPU devices for handling the service request received from the client system based at least in part on the determined hardware interconnect topology of the GPU server node and the performance metrics, wherein the group of GPU devices is dynamically formed at least in part by selecting one or more GPU devices of the GPU server node which are determined to be interconnected with higher priority interconnect paths as compared to other GPU devices of the GPU server node which are determined to be interconnected with lower priority interconnect paths; and
provisioning the dynamically formed group of GPU devices to the client system to handle the service request.

9. The article of manufacture of claim 8, further comprising program code that is executable by the processor to perform a method comprising accessing one or more quality of service policies associated with the client system, wherein the group of GPU devices is dynamically formed based at least in part on the one or more quality of service policies associated with the client system.

10. The article of manufacture of claim 8, wherein the performance metrics comprise a predefined priority score that is accorded to a type of interconnect path that is used to connect a GPU device and a network adapter which is utilized to connect to the GPU server node.

11. The article of manufacture of claim 8, wherein the performance metrics comprise a predefined priority score that is accorded to a type of interconnect path that is used to connect two GPU devices of the GPU server node.

12. The article of manufacture of claim 8, wherein the performance metrics comprise a predefined priority score that is accorded to a type of interconnect path which includes a processor socket-level link, wherein the priority accorded to the type of interconnect path which includes a processor socket-level link is lower than a priority accorded to a type of interconnect path which does not include a processor socket-level link.

13. The article of manufacture of claim 8, further comprising program code that is executable by the processor to perform a method comprising:
generating a system topology data structure comprising information regarding the determined hardware interconnect topology of the GPU server node; and
populating the system topology data structure with priority information for the determined interconnect paths included in the system topology data structure based on the predefined priority scores of the performance metrics data structure.

14. The article of manufacture of claim 8, wherein dynamically forming the group of GPU devices of the GPU server node comprises selecting one or more GPU devices that are already included as part of one or more other dynamically formed groups of GPU devices provisioned to other client systems.

15. A graphics processing unit (GPU) server node, comprising:
a plurality of GPU devices;
a memory to store program instructions; and
a processor to execute the stored program instructions to cause the GPU server node to perform a process which comprises:
receiving a service request from a client system for GPU processing services provided by the GPU server node;
determining a hardware interconnect topology of the GPU server node, the hardware interconnect topology comprising information regarding determined interconnect paths between the GPU devices of the GPU server node and between the GPU devices and hardware components of the GPU server node;

accessing a performance metrics data structure which comprises performance metrics associated with a plurality of different interconnect path types that can be used to connect to GPU devices in a GPU server node topology, wherein the performance metrics comprise predefined priority scores that accord different priorities to the plurality of different interconnect path types;

dynamically forming a group of GPU devices for handling the service request received from the client system based at least in part on the determined hardware interconnect topology of the GPU server node and the performance metrics, wherein the group of GPU devices is dynamically formed at least in part by selecting one or more GPU devices of the GPU server node which are determined to be interconnected with higher priority interconnect paths as compared to other GPU devices of the GPU server node which are determined to be interconnected with lower priority interconnect paths; and provisioning the dynamically formed group of GPU devices to the client system to handle the service request.

16. The GPU server node of claim 15, therein the process performed by the GPU server node further comprises accessing one or more quality of service policies associated with the client system, wherein the group of GPU devices is dynamically formed based at least in part on the one or more quality of service policies associated with the client system.

17. The GPU server node of claim 15, wherein the performance metrics comprise a predefined priority score that is accorded to a type of interconnect path that is used to connect a GPU device and a network adapter which is utilized to connect to the GPU server node.

18. The GPU server node of claim 15, wherein the performance metrics comprise a predefined priority score that is accorded to a type of interconnect path that is used to connect two GPU devices of the GPU server node.

19. The GPU server node of claim 15, wherein the performance metrics comprise a predefined priority score that is accorded to a type of interconnect path which includes a processor socket-level link, wherein the priority accorded to the type of interconnect path which includes a processor socket-level link is lower than a priority accorded to a type of interconnect path which does not include a processor socket-level link.

20. The GPU server node of claim 15, therein the process performed by the GPU server node further comprises:

generating a system topology data structure comprising information regarding the determined hardware interconnect topology of the GPU server node; and populating the system topology data structure with priority information for the determined interconnect paths included in the system topology data structure based on the predefined priority scores of the performance metrics data structure.

\* \* \* \* \*